Sept. 22, 1959 R. E. GRAHAM 2,905,756

METHOD AND APPARATUS FOR REDUCING TELEVISION BANDWIDTH

Filed Nov. 30, 1956 5 Sheets-Sheet 1

INVENTOR
R. E. GRAHAM
BY Harry C. Hart
ATTORNEY

METHOD AND APPARATUS FOR REDUCING TELEVISION BANDWIDTH

Filed Nov. 30, 1956 5 Sheets-Sheet 2

INVENTOR
R. E. GRAHAM
BY Harry C. Hart
ATTORNEY

Sept. 22, 1959 R. E. GRAHAM 2,905,756

METHOD AND APPARATUS FOR REDUCING TELEVISION BANDWIDTH

Filed Nov. 30, 1956 5 Sheets-Sheet 3

INVENTOR
R. E. GRAHAM
BY Harry C. Hart
ATTORNEY

Sept. 22, 1959 R. E. GRAHAM 2,905,756

METHOD AND APPARATUS FOR REDUCING TELEVISION BANDWIDTH

Filed Nov. 30, 1956 5 Sheets-Sheet 4

INVENTOR
R. E. GRAHAM
BY
Harry C. Hart
ATTORNEY

METHOD AND APPARATUS FOR REDUCING TELEVISION BANDWIDTH

Filed Nov. 30, 1956 5 Sheets-Sheet 5

INVENTOR
R. E. GRAHAM
BY Harry C. Hart
ATTORNEY

United States Patent Office 2,905,756

Patented Sept. 22, 1959

2,905,756

METHOD AND APPARATUS FOR REDUCING TELEVISION BANDWIDTH

Robert E. Graham, Chatham Township, Morris County, N.J., assignor to Bell Telephone Laboratories, Incorporated, New York, N.Y., a corporation of New York Application November 30, 1956, Serial No. 625,476

10 Claims. (Cl. 178—6)

This invention relates to the processing of electrical communication signals and more particularly to the transmission and reception of signals of the type which ordinarily require considerable transmission channel capacity.

In order to ensure faithful reproduction at the receiver of the entire range of frequencies and amplitudes contained in communication signals, for example, television signals, many communication systems employ broad band transmission channels. It can be shown that many of these systems employ a channel capacity greater than that required to send an amount of information actually necessary to describe a message. Since most communication signals are not random, but exhibit a considerable degree of correlation which may be for example, semantic, spatial (television, for example), chronologic and so on, a considerable increase in transmission efficiency is possible by taking advantage of one or more of these correlations. For example, the correlation present in small picture regions in most television scenes makes possible the prediction of the future of the signal in terms of its past. If the method used for prediction makes full use of the entire pertinent past, then an error signal equivalent to the difference between the actual and the predicted signal may be derived which is a completely random wave of lower average power than the original signal but, nevertheless, contains all of the information of the original signal. Moreover, by providing highly accurate prediction, the difference between the actual signal and the predicted signal, which constitutes the error signal, has a very small amplitude most of the time. This property allows the error signal to be expressed in a variable length binary code which requires much less transmission bandwidth than direct binary encoding of the original picture signal.

One method of prediction which does not make full use of the past, but which is nevertheless markedly effective and also appealing because of its relative simplicity, is linear prediction wherein the predicted value of a particular signal sample is made up of the sum of the previous signal values each multipled by an appropriate weighting coefficient determined by its time spacing in the past. The best values for the weighting coefficients depend upon the statistics of the signals, but once they have been determined, the prediction may be made by relatively simple apparatus. It is evident that the effective saving in channel capacity realized by signal prediction depends directly on predictor performance.

In order to achieve a substantial reduction in required channel capacity, exploitation of the higher order statistics of the signal is desirable. For example, a reduction in channel capacity may be achieved by employing a nonlinear coding means which encodes any particular signal sample on the basis of statistical information in the signal related to the probability of the occurrence of that particular sample amplitude. In Patent 2,721,900, granted October 25, 1955, to B. M. Oliver, several exemplary arrangements of nonlinear computing means capable of performing this type of coding are disclosed, these arrangements including the so-called monogrammer and digrammer. A problem associated with this encoding technique, however, is that it requires terminal equipment of considerable complexity.

Manifestly, a substantial reduction in required channel capacity may be achieved by utilizing a prediction method wherein the pattern or mode of prediction is caused to vary dynamically from point to point, dependent on the nature of the local picture environment. A variant prediction system of this sort is, in many ways, simpler and more effective in operation than the invariant systems heretofore proposed, and results in more nearly perfect prediction whereby a greater saving in channel capacity is realized without a corresponding deterioration of picture quality.

It is thus the principal object of the present invention to decrease the channel capacity requirements for wide band signal transmission by reducing the redundancy in signals which are transmitted.

It is another broad object of the invention to improve the efficiency of a prediction-error transmission system.

It is a further object of the invention to make a number of accurate predictions of samples of a message signal based on past signal statistics, and to select for encoding that predicted sample that best appears to represent the given sample.

The present invention, in one of its more important aspects, relates to a variant prediction-error system which adapts itself to the individual signal surroundings so that the pattern or mode of prediction varies dynamically from point to point depending on higher order picture statistics. Broadly, the predictor has at its disposal a variety of relatively simple prediction modes based on past signal history. By judiciously choosing the best mode at any particular instant the predicted signal value may be produced according to a certain fixed rule such that the receiver, which also has at its disposal the past history of the signal, can duplicate the varying prediction pattern according to the same rule. According to a preferred embodiment of the invention, the rule controlling the transmitter and receiver prediction pattern is that of determining the direction of constant brightness contour lines in the vicinity of the point to be predicted and then making a prediction parallel to the contour lines.

In accordance with the invention and in furtherance of its various objects, signal redundancy is materially reduced by periodically sampling the message wave to be transmitted, predicting the succeeding value of the signal in a number of different ways to produce a number of prediction modes, determining which mode appears best suited for a minimum-error prediction of the sample, combining the selected predicted value with the actual value, and then transmitting only the difference, i.e., the error in prediction. At the receiver, the received error signal and a computed signal, equivalent to the predicted value at the transmitter, are combined to yield a replica of the original signal. This technique relies for its effectiveness on the aforementioned correlation or interdependence which is found to exist in several forms in substantially all communication signals.

In all of the embodiments to be described, it is in accordance with this invention, although not necessary thereto, to quantize the signal sample amplitudes and to transmit pulses representative of these amplitudes, i.e., to employ those techniques which are familiar in the art as "pulse code modulation." While the coding and decoding operations can be performed by any of those means which are well known in the art for performing such functions, it can be said that variant prediction itself is a form of coding, and that the multimode predictor employed in the invention in effect performs a certain type of encoding of the message. It is to be understood, however, that particular forms of saving in channel capacity may be obtained through the supplementary use of various other types of encoding such as, for example, variable length codes, or run length codes, both of which are described in "Efficient Coding" by B. M. Oliver, Bell System Technical Journal, vol. III, No. 4, July 1952.

The invention will be more fully understood in the light of the following detailed description taken in connection with the appended drawings, in which.

Figure 1:
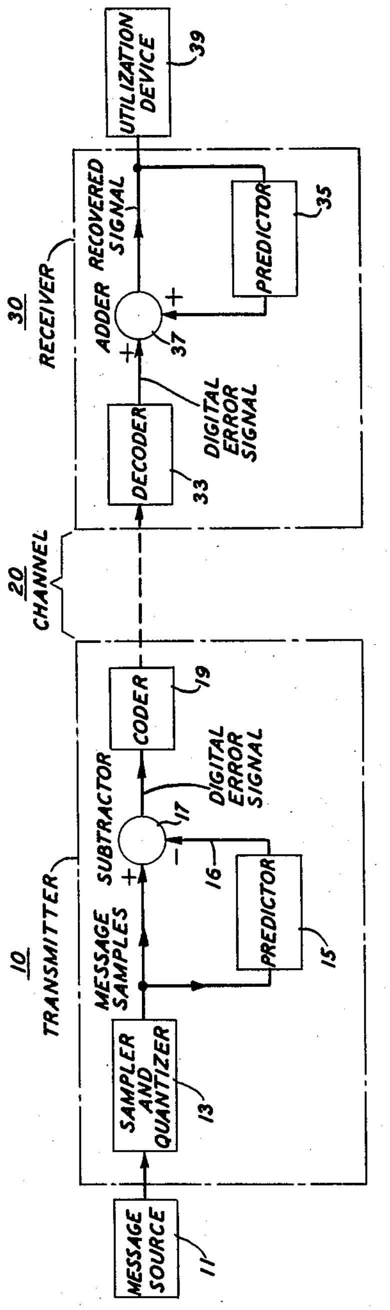
Fig. 1 is an overall block diagram of a simple illustrative embodiment of the basic transmission system of the invention.

In Fig. 1, there is shown a simple illustrative arrangement of a communication system embodying the principles of the invention. The message from a source 11 is applied to a transmitter 10, where it is operated on to yield an output signal from which much of the redundancy has been removed. If this message from source 11 is a continuous wave, the first stage of the transmitter is a sampler and quantizer 13, which produces as an output signal a series of message wave samples as pulses of different amplitudes. The quantized samples are next applied to a predictor 15, which, in accordance with the invention, supplies a series of predictions, each of which is based on the values of one or more of the previous samples in a manner particularly appropriate in view of interrelationships among past sample values. Each of the predicted sample values produced by predictor 15 is supplied to a subtractor 17 at the same instant that a true corresponding sample from quantizer 13 is received by the subtractor. The two are compared and the error signal, if any, constitutes the output signal which may be transmitted in any customary manner. In accordance with a preferred embodiment of the invention, the output signal is encoded in an encoder 19 and sent over the channel 20.

At the receiver 30, the signal is decoded in decoder 33 and supplied by way of adder 37 to a predictor 35 which is identical to the predictor 15 in the transmitter and which makes the same predictions as does the transmitter predictor 15. In this case the predictions are based on the message samples recovered from the decoder 33 which can for the present be assumed to be the same as the original message samples derived from the quantizer 13 in the transmitter 10. Since a departure from the best prediction value made by receiver predictor 35 will be the same departure as that made by predictor 15 at the transmitter, when the output of this predictor is added to the received error signal in adder circuit 37, the resultant output signal is equivalent to the original sample, and may be supplied to utilization device 39. If a continuous wave message is desired instead of a sampled output signal, the recovered sampled output may first be fed to a filter circuit which may operate in accordance with established electronic techniques to yield a continuous wave from the sample pulses. Such a continuous wave is substantially equivalent to the original message and may then be applied to the utilization device 39.

All of the elements of Fig. 1 are, with the exception of the predictors, well known in the art. For example, adders and subtractors, in accordance with the invention, can be simple resistance or electronic networks supplied with the proper polarity of signals. Similarly, it is in accordance with the invention to use quantizers of any of several types which are well known. Similarly, there may be utilized a pulse code transmission system in which the coder and decoder employed are of the type described in the Bell System Technical Journal, January 1948, the articles being entitled "An Experimental Multichannel Pulse Code Modulation System of Toll Quality" by L. A. Meacham and E. Peterson, and "Electron Beam Deflection Tube for Pulse Code Modulation" by R. W. Sears. The predictors 15 and 35 which are capable of serving the functions demanded by the invention are described fully hereinafter.

Figure 2:
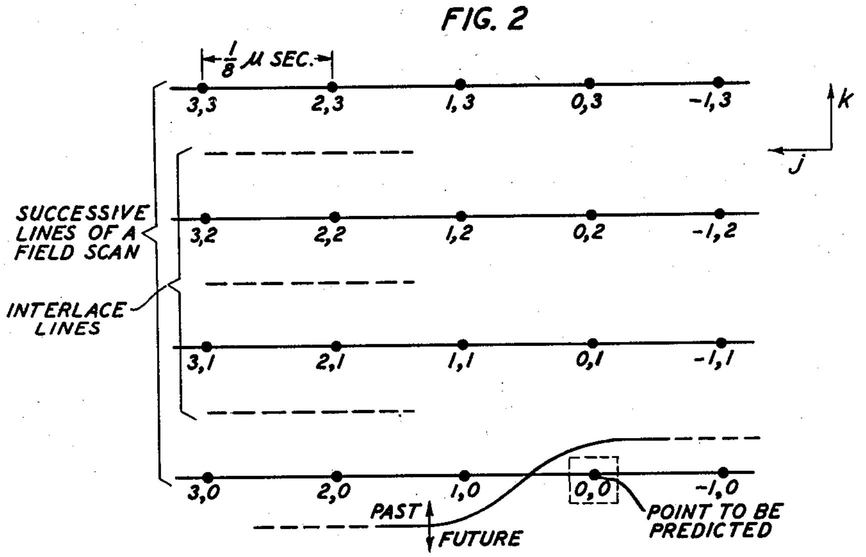
Fig. 2 is a pictorial diagram illustrating the spatial relationship of the samples in a portion of the raster of a television picture which is useful in explaining the operation of the invention.

There is shown in Fig. 2 a portion of the raster of a television picture wherein the scanning pattern of the even field of an interlaced frame is shown in solid lines and the scanning pattern of the odd field is shown in dashed lines. The typical sample points of a single field are illustrated as being distributed along the scanning pattern. For example, $S_{jk}$ represents the value of the television signal at a sample point $(j,k)$. Accordingly, a point to be predicted may be represented as $S_{00}$, and the past signal values neighboring this point may be designated $S_{10}$, $S_{20}$, $S_{01}$, $S_{11}$, $S_{21}$, et cetera. A linear prediction of point $S_{00}$, that is, a prediction made up by adding past samples having weighting coefficients determined by their time spacing in the past, is defined by $$S_{00}=a_{10}S_{10}+a_{01}S_{01}+a_{11}S_{11}+a_{20}S_{20}+ \ldots \quad (1)$$

or $$S_{00}=\sum_{j=0}\sum_{k=0}a_{jk}S_{jk}$$

$$(k\geq 0)$$
$$(j>0 \text{ for } k=0)$$

where the positive or negative coefficients $a_{jk}$ are fixed and independent of the values of the signal sample $S_{jk}$. The indicated constraints on the values of $j$, $k$ in the double summation serve to exclude present and future values from the predictor data. It is to be understood, however, that past fields or frames may be included in the prediction system and symbols such as $a'_{jk}$ $S'_{jk}$, et cetera, may be used to denote the corresponding weighting coefficients and sample values. In any event the arrangement of coefficient values $a_{jk}$ forms a constant prediction mode or pattern which translates along through the grid of sample points as the scanning proceeds.

Since experiments have indicated that linear invariant means of prediction are limited in their possibilities for reducing the channel capacity requirements, it is in accordance with the invention to employ a variant means of prediction which causes the prediction pattern or mode to vary dynamically from point to point dependent upon the nature of the local picture environment. As mentioned above, a varying prediction pattern of this sort may be achieved by providing a plurality of prediction modes and then choosing that one which is most likely to be the best description of the present signal value.

It is apparent that if the transmitter bases its running choice of prediction mode only upon the past, the receiver can automatically duplicate the same varying prediction pattern without requiring additional transmitted information.

In instrumenting such a system, it can be seen that a suitable rule for predicting a signal may advantageously be predicated on the assumption that within small picture areas the brightness distribution consists of contours having approximately a fixed orientation. Thus, if a determination of the direction of the contour lines in the vicinity of the point to be predicted is made, the most appropriate prediction value based on this contour line may then be utilized. For example, it may be assumed that the small area brightness contours within small picture areas are approximately either horizontal or vertical. Thus, in predicting the point $S_{00}$ in a matrix of the type $$\begin{matrix} S_{11} & S_{01} \\ S_{10} & S_{00} \end{matrix}$$

where $S_{00}$ is the element to be predicted and $S_{10}$ is the adjacent picture element on the same line, $S_{01}$ and $S_{11}$ being the corresponding picture elements in the adjacent line (in the same field), it is apparent that, when the absolute value of the signal difference $S_{11}-S_{01}$ is a minimum, a generally horizontal contour is present and the value $S_{10}$ is the most appropriate prediction. Similarly, when the absolute difference $S_{11}-S_{10}$ is a minimum, it is reasonable to assume that a generally vertical contour is present making the value $S_{01}$ the appropriate prediction value.

Figure 3:
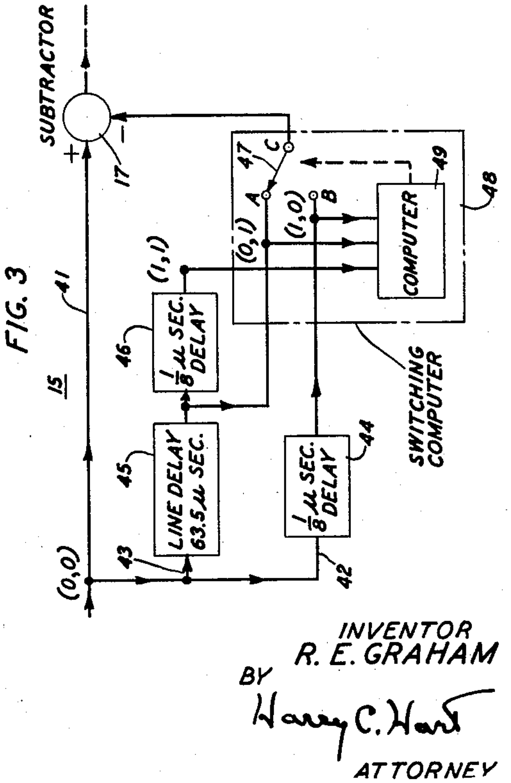
Fig. 3 is a schematic block diagram of an illustrative arrangement of a dual-mode predictor for use in a transmitting circuit according to the invention.

There is shown in Fig. 3 a specific example of a variable-mode predictor suitable for use as the predictor 15 of Fig. 1. In this embodiment, two prediction modes are possible: (*a*) previous value horizontal, and (*b*) previous value vertical (alternatively called previous line). In the figure, the signal samples which are provided by the sampler and quantizer 13 of Fig. 1 are passed simultaneously into a transmission path 41 and two delay paths 42 and 43. The transmission path 41 applies the present value signal to subtractor circuit 17 previously described. The first delay path 42 comprises a substantially lossless delay device 44 which provides a delay of one Nyquist interval, that is, a delay equal to the interval between successive picture samples. As is well known, such a delay for a normal 4 megacycle television signal is approximately ⅛ microsecond in duration. In achieving this delay interval, it has been found convenient to employ a so-called acoustic delay line. It is to be understood, however, that any other well known delay device may be used for achieving this delay.

It is thus apparent that if the sample $S_{00}$ is just being applied to the paths 41 and 42, the signal appearing at the output of delay device 44 is the immediately preceding sample $S_{10}$ in the same line. This delayed sample is applied to terminal B of electronic switch 47 and to computer 49, both of these elements being included in switching computer 48.

The second delay path 43 comprises delay devices 45 and 46 connected in tandem, the device 45 imparting a delay equivalent to one full line time, and the delay device 46 providing a delay of one Nyquist interval. The delayed signal sample derived from device 45 is applied to terminal A of switch 47, and to computer 49, while the delayed sample derived from device 46 is coupled to computer 49. Accordingly, there is available at terminal A of switch 47, a signal, representative of the sample $S_{01}$, separated from the instant sample by one line time, and at terminal B a sample $S_{10}$ separated from the instant sample by one Nyquist interval. Additionally, the sample $S_{11}$ which is separated from the instant sample by one line time plus one Nyquist interval, is available for use in the computer.

By virtue of the electronic switch 47, only one of the delayed signals, $S_{01}$ or $S_{10}$, is selected at any one instant to be supplied to the subtractor 17 as a predicted value of the instant sample. The switch is activated by the output signal from computer 49 to be described more fully hereinafter, which determines the prediction mode, that is, which of the available values is to be used for the prediction. In accordance with the principles set forth above, the computer compares the absolute values of the difference between pairs of adjacent signals to determine the general contour pattern, and then switches either mode A or mode B into the subtractor input.

Figure 4:
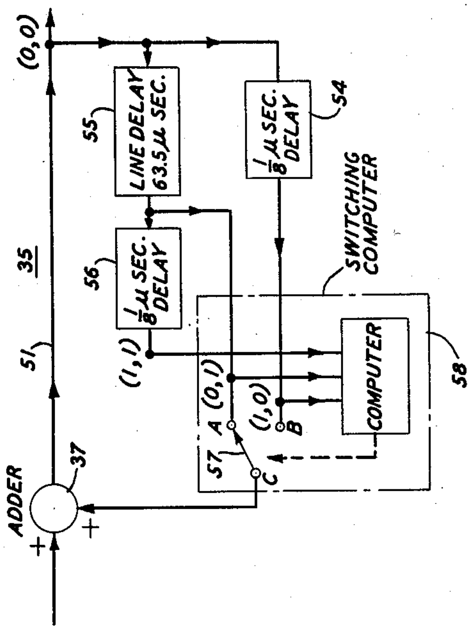
Fig. 4 is a schematic block diagram of a dual-mode predictor for use in a receiving circuit according to the invention.

In Fig. 4, there is shown a dual-mode predictor suitable for use as the predictor 35 in the receiver portion of Fig. 1. The receiver predictor is in all respects equivalent to that of the transmitter predictor in that it provides two prediction modes A and B identical to modes A and B at the transmitter, and utilizes a switching computer 58 similar to computer 48 of the transmitter. The selected prediction mode is switched to the adder 37 by an electronic switch 57 as described above. Since the prediction is based entirely upon the past values $S_{10}$, $S_{01}$, and $S_{11}$, the receiver predictor 35 will make the same decisions as the transmitter and the two switches, i.e., the transmitter switch and the receiver switch, will operate in synchronism whereby the receiver opperation duplicates the prediction operation of the transmitter to produce a predicted value which is combined with the received error signal to yield a replica of the original signal.

As pointed out above, a variety of rules for the switching computer may be utilized. For example, a simple suggested rule is:

$$\text{Switch to "A," i.e., predict } S_{00}=S_{01}, \text{ if } |S_{11}-S_{10}|<|S_{11}-S_{01}| \quad (3)$$

and, $$\text{Switch to "B," i.e., predict } S_{00}=S_{10}, \text{ if } |S_{11}-S_{10}|>|S_{11}-S_{01}| \quad (4)$$

In operating according to the above rule, the switching of the computer need take place only at or slightly before the periodic sampling times. Since the above comparison operations are carried out with quantized signals, substantially perfect agreement may be obtained between the similar operations at the transmitter and receiver. For completeness, it may be arbitrarily specified that when $|S_{11}-S_{10}|$ equals $|S_{11}-S_{01}|$, the chosen computer mode may be "A."

By following a rule of this general sort, the computer attempts to determine the direction of constant brightness contour lines in the vicinity of the point to be predicted and then makes a previous value prediction parallel to the contour lines.

Figure 5:
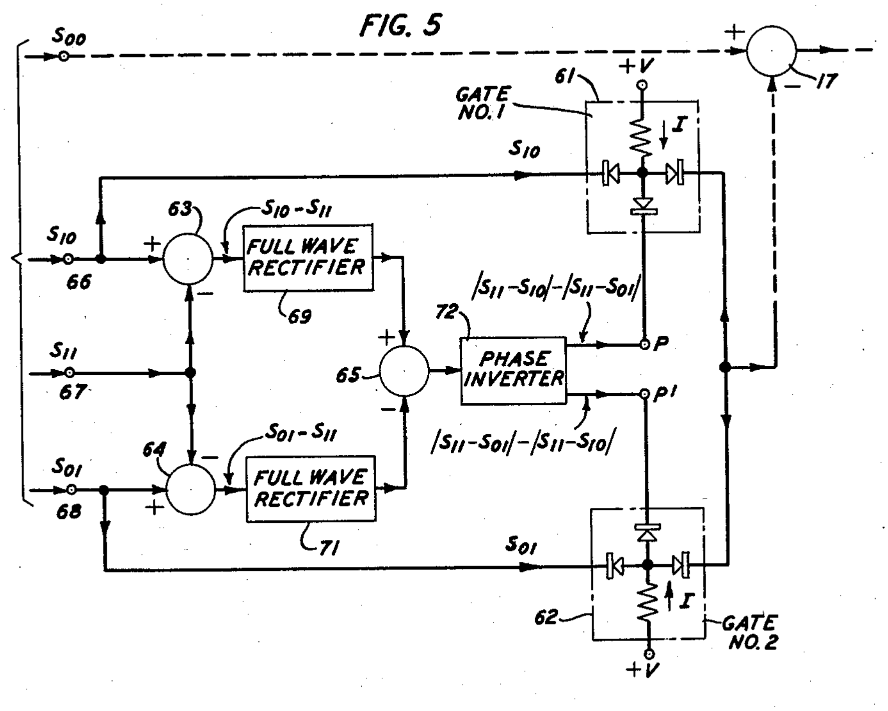
Fig. 5 is a diagram, partly in block form and partly in schematic form, of a two-mode switching computer which may be used in the transmitter of Fig. 3 or the receiver of Fig. 4.

In Fig. 5 there is shown a preferred form of a two-mode switching computer which may be used in the circuits of Figs. 3 and 4. The previous value signal samples $S_{10}$, $S_{11}$ and $S_{01}$, derived from the delay devices of the predictors, are supplied to the computer terminals 66, 67 and 68, respectively. Samples $S_{10}$ and $S_{01}$ are applied directly to terminals of the gates 61 and 62. The gates, which may be of the simple diode type disclosed in Patent 2,576,026 to L. A. Meacham, granted November 20, 1951, are activated (that is, opened or closed) by keying signals appearing at terminals P and P′. When one of the gates is closed (i.e., transmitting), the signal sample controlled by that gate is supplied to the subtractor 17.

In order to activate the gates, which take the place of the switch 47 in the predictor of Fig. 3 or switch 57 in the predictor of Fig. 4, a double comparison operation takes place. To this end, the computer is supplied with sample $S_{11}$ as well as with samples $S_{10}$ and $S_{01}$, and, by subtraction in subtractors 63 and 64, produces two difference signals $S_{10}-S_{11}$ and $S_{01}-S_{11}$. These difference signals are compared by passing them through full wave rectifiers 69 and 71 to produce the absolute values of these direrences, and are combined in subtractor 65 to produce an absolute-value secondary difference signal. A phase inverter 72 provides secondary difference signals of both polarities, i.e., $|S_{11}-S_{10}|-|S_{11}-S_{01}|$ and $|S_{11}-S_{01}|-|S_{11}-S_{10}|$. These signals are indicative of the brightness contour pattern of the picture in the neighborhood of $S_{00}$, and are applied to terminals P and P′, respectively, to act as the keying signals for gates 61 and 62. Thus, gate No. 1 conducts when the point P is positive, thereby transmitting $S_{10}$ as the prediction. A negative value signal simultaneously appears at P′ to block gate No. 2. When P′ becomes positive and hence P negative, the gate conditions are interchanged and $S_{01}$ is transmitted as the prediction.

Although full wave rectifiers are employed in the computer of Fig. 5 to produce the absolute values of the difference signals, it is apparent that all that is actually required is that both the positive and negative values of the difference signals be treated in like manner. Thus, other devices responsive to both the positive and negative polarity of a signal may be employed in place of the rectifiers. Moreover, the absolute value function may be replaced by another function, for example, a square-law function.

Figure 6:
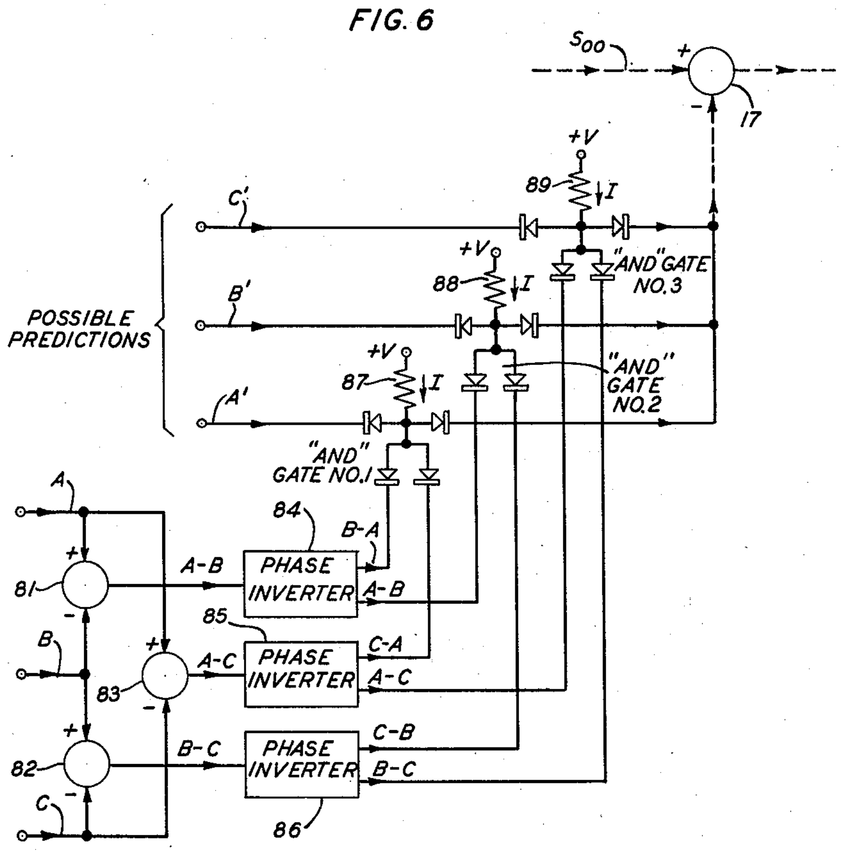
Fig. 6 is an illustration, partly in schematic and partly in block diagram form, of a three-mode switching computer for use in the invention.

For purposes of illustration, there is shown in Fig. 6 another form of switching computer which may be used in a multi-mode predictor according to the invention. It will be convenient to let the quantities A, B, and C represent the absolute values of three monitored difference signals. For example, let:

$$A=|S_{11}-S_{10}|$$
$$B=|S_{11}-S_{01}|$$
$$C=|S_{01}-S_{10}|$$

respectively. A′, B′, and C′ then represent three associated prediction choices, such as:

$$A'=S_{01}$$
$$B'=S_{10}$$
$$C'=S_{-1,1}$$

where $S_{-1,1}$ represents a past sample according to Fig. 2. The selection of prediction modes for this computer may be according to the following rule:

Predict A′ if $A<B, C$
Predict B′ if $B<A, C$
Predict C′ if $C<A, B$

In the computer of Fig. 6, the three absolute differences A, B, and C are cross-compared by pairs in subtractors 81, 82, and 83 to form three secondary difference signals. Phase inverters 84, 85, and 86 are used to provide secondary difference signals of both polarities. These six signals, which act as the gate control signals, are connected to three gates 87, 88, and 89 each having two "And" type control inputs. Gates of this type are well known in the art. Only the gate having two positive control inputs will be closed, that is, in a low conduction or transmitting state. Thus, for example, when two positive control signals are applied to the inputs of gate No. 1, the predicted signal A′ is coupled to the negative terminal of subtractor 17. Generalization of the computer to $n$ prediction modes evidently requires the use of $n$ gates, each with $n+1$ diodes. In some circumstances, cathode ray tube techniques might be desirable to accomplish some of the necessary switching in preference to extensive diode arrays.

While the systems illustrated above have been described as making a determination from the immediately adjoining picture elements only as to whether the contours are more nearly horizontal or vertical, other monitoring or prediction points may be included, and the computer rules modified to include additional angles. Further, it is within the ambit of the invention to employ prediction modes other than previous value or previous line prediction. For example, planar, circular, or slope prediction as fully discussed by Mr. C. W. Harrison in an article entitled "Experiments With Linear Prediction in Television," published in the Bell System Technical Journal, vol. 31, July 1952, at pages 764 through 783, may be used. If a complete frame delay is available, previous frame prediction could also be added to the potential prediction modes, insuring near perfect prediction on still pictures and improved renditions for moving pictures. It is apparent, that by enlarging the computing matrix to include a greater number of points bordering the point to be predicted, a more effective prediction, and thus a greater saving in channel capacity can be obtained.

Figure 7:
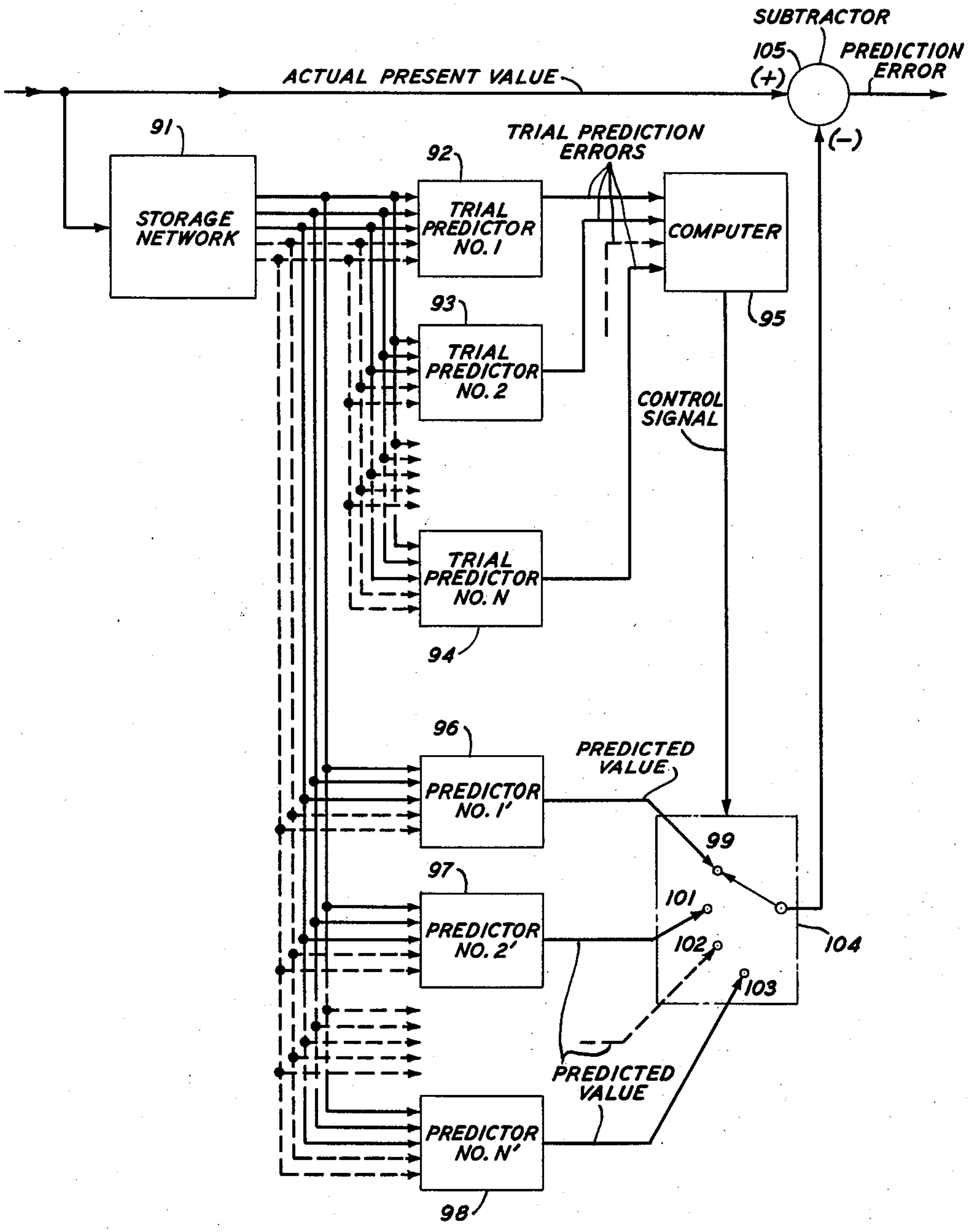
Fig. 7 is a block diagram of a multi-mode predictor in accordance with the invention.

There is shown in Fig. 7 the block diagram of a multi-mode prediction system arranged to produce a number of prediction values according to a variety of prediction modes. In the figure, a storage network 91, supplied with the incoming message signal, provides a plurality of previous value signals forming a martix of samples adjoining the point to be predicted. These previous value samples are applied to trial predictors 92, 93, and 94, respectively (each of which includes a predictor circuit and a subtractor circuit of a form similar to that illustrated in the transmitter of Fig. 1). In each of these units, a trial prediction is made according to a different one of the above-mentioned schemes. Thus, for example, trial predictor 92 predicts the signal value of a previous sample neighboring the instant sample according to a slope rule while trial predictor 93, for example, employs circular prediction to predict the value of either the same or another previous neighboring sample. Any number of such trial predictions, according to any of the various prediction rules, may be made in this manner. Alternatively, each of the trial predictors may be arranged to use the same mode or rule of prediction but in a different direction or angle. As a result of the prediction and subtraction operation performed in each of the trial units 92 through 94, a plurality of trial error signals derived entirely from the signal past is produced. Each of the resulting error signals is applied to a computer 95 which determines the minimum error and develops a control signal accordingly. The selection of the control signal may, of course, be made to depend on various other properties of the several trial error signals, i.e., in other ways than by determining a minimum error.

The previous value signals derived from storage network 91 are also applied to a plurality of predictors 96, 97 and 98, each of which produces a predicted value of the present value sample according to any one of the above-mentioned rules. These predictors need not, however, predict according to the same rules as trial predictors 92 through 94. The various predictors and trial predictor-subtractor combinations may conveniently and economically be included in a single operating unit.

Each of the predicted value signals, derived from predictors 96 through 98, is coupled to one of the terminals (99 through 103, et cetera) of switch 104, which switch may be of the type heretofore described. Switch 104 is activated by the control signal produced by computer 95 in accordance with the results of the comparison of the several trial prediction error signals. Thus, one of the predicted value signals available at the switch 104 is applied to subtractor 105 according to the results of the trial predictions made in units 92, 93, and 94. It is evident, therefore, that the entire pertinent past of a signal may be examined to determine the most probable trend of signal changes, and subsequently a prediction according to that determination may be made. The selected prediction value from switch 104 is applied to subtractor 105 together with the actual present value signal such that each of the predicted value signals appears at the same instant that the actual present value signal is received. The two are compared in subtractor 105 and the error, if any, is sent over a communication channel to a receiver station.

At the receiver station an identical multi-mode prediction system makes the same predictions based on the recovered prediction error samples, as the transmitter prediction system. Since the receiver predictor has available the entire signal past, its predictions are the same as those made at the transmitter. Thus when the output of the receiver predictor is added to the received error signal, the resulting signal is a facsimile of the original message signal.

Figure 8:
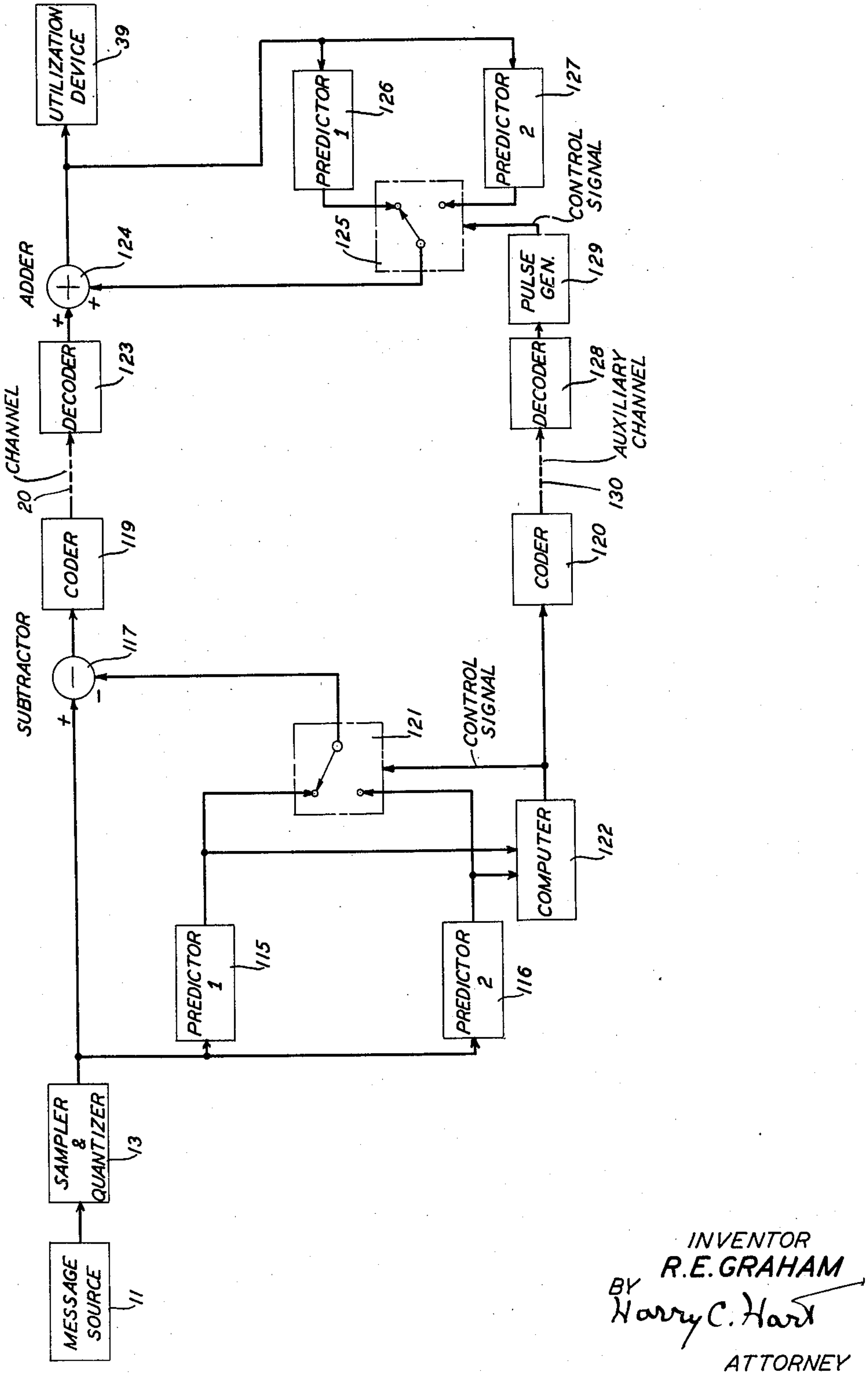
Fig. 8 is a schematic block diagram of an alternative form of multi-mode prediction system in accordance with the invention.

Another possible operating system is one in which the predictor at the transmitter makes use of the present as well as the past and then sends an auxiliary signal to the receiver to identify the mode employed at the transmitter to produce the predicted signal value. The received auxiliary signal controls the mode of the receiver predictor. This may be profitable when the required additional information rate is relatively low. Fig. 8 illustrates such a system.

In the system shown in Fig. 8, quantized message samples supplied by source 11 and quantizer 13 are applied to predictors 115 and 116 in parallel to produce at the terminals of switch 121 two different predicted values of the present value signal. The predicted values are also supplied to computer 122 which determines the prediction mode for each sample and generates a suitable signal to identify it. For the two-mode system shown, a simple binary mode signal is sufficient. If additional prediction values are available, more sophisticated coding of the mode signal is, of course, required. The mode signals are used to activate switch 121 and are also encoded for transmission in coder 120. Thus, in dependance on the outcome of the computer analysis, one or the other of the predicted values is selected and combined with the present value signal in subtractor 117 to produce an error signal. The error signals are encoded in coder 119 and transmitted over channel 20 to a receiver station. The encoded mode signals are transmitted over auxiliary channel 130 to the receiver station. Although two separate channels are shown to illustrate the general principles of this embodiment of the invention, it is obvious that any form of signal multiplexing or the like may be employed to permit both signals to be transmitted over a single channel.

At the receiver both signals are decoded. The error signals recovered from decoder 123 are applied by way of adder 124 to predictors 126 and 127 in parallel to produce at the terminals of switch 125 the same predicted values of each sample that were made at the transmitter. The predicted value signal to be applied to adder 124 is determined for each sample by the mode signal transmitted over the auxiliary channel. Thus, the auxiliary channel takes the place of the receiver computer employed in previously described systems and ensures exact correspondence between the mode selected at the transmitter and that selected at the receiver. Effectively more accurate prediction is possible and a wider range of prediction modes may be employed. The mode signals recovered from decoder 128 and used to activate switch 125 may be applied, if desired, to pulse generator 129 to shape the recovered auxiliary signals to suitable form. Normally, this shaping is unnecessary.

Predicted signal values, identical to those selected at the transmitter, are thus applied by switch 125 to adder 124 where they are combined with received error signals to yield at the output of the adder a replica of the original message signal. This signal may be supplied to utilization device 39.

It can be seen that numerous other arrangements may be devised by those skilled in the art without departing from the spirit and scope of the present invention and so it is to be understood that those arrangements which have been described are illustrative of the applications of the general principles of the invention.

What is claimed is:

1. A system for the transmission of a message wave comprising means for sampling said message wave to derive therefrom message samples, means for deriving a plurality of delayed message samples, each sample of said plurality representing the value of a previous sample of said wave, means for concurrently deriving from said plurality of previous value samples a plurality of predicted samples, subtracting means supplied with said message samples, means for applying at least one of said predicted samples to said subtractor to produce an error signal, and means for transmitting said error signal to a receiver station.

2. A transmission system comprising means supplied with a message wave for deriving message samples, means for deriving a plurality of delayed message samples, each sample of said plurality representing a previous value of an instantaneous sample, first means for combining the plurality of delayed samples with preassigned weighting and polarity in accordance with the statistics of said message wave to derive a first predicted value, second means for combining the plurality of delayed samples with different preassigned weighting and polarity in accordance with the statistics of said message wave to derive a second predicted value, a subtractor circuit supplied with said instantaneous samples, switching means for selectively applying one of said predicted values to said subtractor for utilization therein, and means for transmitting the output of said subtractor to a receiver station.

3. A transmission system according to claim 2 in which said means for selectively applying one of said predicted values to said subtractor comprises a plurality of gating circuits.

4. In a system for transmitting the differences between the instantaneous amplitude of a continuously variable signal and a signal based upon the past history of the variable signal, means at the transmitter of said system for deriving a plurality of predicted values of said instantaneous signal, each of said predicted values being based on a different combination of past signal values, means for deriving a plurality of trial prediction error signals, computing means for intercomparing each of said trial predictor-error signals, means for selecting one of said plurality of predicted values in accordance with the results of said comparison, means for combining the selected previous value with said continuously variable signal for deriving an error signal, means for transmitting said error signal to a receiver station, and means at said receiver station for utilizing said error signal to reconstruct a facsimile of said continuously variable signal.

5. In a transmission system means supplied with a message signal for sampling said signal to derive thereby message samples, means for quantizing said message samples to a predetermined number of amplitude levels, means for deriving a plurality of delayed quantized message samples, each representing a previous value of said signal, means for combining said plurality of delayed quantized samples to produce concurrently a plurality of prediction signals, means for selecting that one of said prediction values that best represents said quantized message sample, subtracting means supplied with said selected prediction value and with said message sample for obtaining a prediction-error signal, means for transmitting said prediction-error signal to a receiver station, means for transmitting to said receiver station an auxiliary signal to identify that one of said prediction-error signals selected for transmission, and means at said receiver station for utilizing said error signal and said auxiliary signal to reconstruct a facsimile of said message wave.

6. In a system for the transmission of electrical communication signals comprising a transmitter and a receiver, means at the transmitter supplied with a message wave for sampling said wave to derive thereby message pulses, means for concurrently deriving a plurality of delayed message pulses each representing a previous value of said signal, means for selecting at least one of said previous value pulses in accordance with the previous amplitude variation pattern of said message wave, subtracting means supplied with said selected previous value pulse and with said message sample pulse for obtaining an error signal for transmission, and means at the receiver for utilizing said error signal to reconstruct a facsimile of said message wave.

7. A transmission system for transmitting the difference between the instantaneous amplitude of a continuously varying signal and a signal based upon the past history of the varying signal comprising means supplied with a message wave for sampling said wave to derive thereby message samples, first means for predicting the value of each of said message samples, second means for predicting the value of each of said message samples, means for comparing each one of said predicted message sample values with a predetermined combination of past message samples, means for selecting that one of said predicted values in accordance with said comparison that best appears to represent said message sample value, and subtracting means supplied with said selected predicted value and with said message sample for obtaining a differential sample.

8. In a television transmission system in which a picture scene is scanned in a pattern of successive parallel lines to obtain a continuous message wave, means for sampling said wave to derive thereby message samples, means for concurrently deriving a plurality of predicted value samples of each of said message samples, means for determining the values of samples located in the constant brightness contour lines of said picture scene in the neighborhood of an instant message sample, means for selecting one of said predicted values in accordance with the outcome of said constant brightness contour line determination, subtracting means supplied with said selected predicted value and with said message sample for obtaining a differential sample for transmission, and means at the receiver of said transmission system for deriving a video signal from said error signal.

9. A transmission system in which there is transmitted the difference between the instantaneous amplitude of a continuously varying message signal and one of a number of predicted values of said instantaneous amplitude comprising a transmitter and a receiver, means at said transmitter for deriving a plurality of delayed message samples each representing a previous value of the instantaneous amplitude of said signal, means for combining said plurality of samples to form a plurality of predicted values, means for selecting one of said predicted values in accordance with the previous history of said continuously varying message signal, and subtracting means supplied with said selected predicted value and with said message sample for obtaining a differential sample for transmission to said receiver and at said receiver, means for deriving a plurality of delayed message samples each of which represents a previous value of the instantaneous amplitude of the received message signal, means for combining said plurality of samples to form a plurality of predicted values, means for selecting one of said predicted values in accordance with the previous history of said continuously varying message signal, and adding means supplied both with said selected predicted values and with said message sample for obtaining a facsimile of said message signal.

10. In a system for transmitting the differences between the instantaneous amplitude of a continuously variable signal and a signal based upon the past history of the variable signal, means for deriving a plurality of delayed message samples each representing a previous value of an instant sample, means supplied with said plurality of delayed message samples for deriving a plurality of different trial prediction signal values of said instant sample, means for subtracting each of said plurality of trial prediction signal values from respective predetermined values to produce a plurality of trial prediction-error signals, means supplied with said plurality of trial prediction-error signals for intercomparing said trial prediction-error signals, means for generating a control signal in accordance with the results of said intercomparison, means supplied with said plurality of delayed message samples for deriving a plurality of different prediction signal values of said instant sample, switching means supplied responsive to said control signal with each of said prediction signal values for coupling one of said prediction signal values to a subtractor circuit in response to said control signal, means for applying said instant sample to said subtractor to produce an error signal and means for transmitting said error signal to a receiver station.

References Cited in the file of this patent

UNITED STATES PATENTS

| | | |
|---|---|---|
| 2,681,385 | Oliver | June 15, 1954 |
| 2,732,424 | Oliver | Jan. 24, 1956 |

FOREIGN PATENTS

| | | |
|---|---|---|
| 693,859 | Great Britain | July 8, 1953 |